United States Patent
Goto et al.

(10) Patent No.: US 8,792,132 B2
(45) Date of Patent: Jul. 29, 2014

(54) IMAGE FORMING APPARATUS FOR PERFORMING IMAGE ADJUSTMENT THAT REDUCES TIME TO PRINT WHEN MARK FORMATION AND PRINTING ARE REQUIRED AT THE SAME TIME

(75) Inventors: Yuji Goto, Nagoya (JP); Kentaro Murayama, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 110 days.

(21) Appl. No.: 13/423,533

(22) Filed: Mar. 19, 2012

(65) Prior Publication Data

US 2012/0243014 A1    Sep. 27, 2012

(30) Foreign Application Priority Data

Mar. 23, 2011    (JP) ................................. 2011-064836

(51) Int. Cl.
G06F 15/00    (2006.01)
G03G 15/01    (2006.01)
B41J 2/435    (2006.01)

(52) U.S. Cl.
USPC ............ 358/1.9; 347/116; 347/234; 399/301; 399/49

(58) Field of Classification Search
CPC .......... G03G 15/0194; G03G 15/5054; G03G 15/5058; G03G 2215/0141; G03G 2215/0161; G03G 2215/0164; H04N 1/047; H04N 2201/04722
USPC ............... 347/116, 234; 399/301, 49; 358/1.9
See application file for complete search history.

(56) References Cited

U.S. PATENT DOCUMENTS

| | | | |
|---|---|---|---|
| 6,763,202 B2 * | 7/2004 | Maeda | 399/53 |
| 2001/0022907 A1* | 9/2001 | Fukao et al. | 399/302 |
| 2006/0153603 A1* | 7/2006 | Nishikawa et al. | 399/301 |
| 2007/0053727 A1* | 3/2007 | Goto | 399/301 |
| 2008/0317495 A1 | 12/2008 | Hyakutake et al. | |
| 2009/0092407 A1 | 4/2009 | Koie | |
| 2009/0190947 A1* | 7/2009 | Kushida | 399/72 |
| 2009/0232539 A1* | 9/2009 | Nozawa et al. | 399/101 |
| 2010/0053638 A1* | 3/2010 | Murayama | 356/620 |
| 2010/0080601 A1* | 4/2010 | Murayama | 399/71 |
| 2010/0247124 A1* | 9/2010 | Aoki et al. | 399/49 |
| 2010/0329722 A1* | 12/2010 | Funayama et al. | 399/72 |
| 2011/0318025 A1* | 12/2011 | Thayer et al. | 399/34 |

FOREIGN PATENT DOCUMENTS

| | | |
|---|---|---|
| JP | 2007-121907 | 5/2007 |
| JP | 2009-003363 | 1/2009 |
| JP | 2009-086527 | 4/2009 |
| JP | 2010-055101 | 3/2010 |

* cited by examiner

*Primary Examiner* — Houshang Safaipour
*Assistant Examiner* — Walter Yehl
(74) *Attorney, Agent, or Firm* — Banner & Witcoff, Ltd.

(57) ABSTRACT

An image forming apparatus which may include a forming unit configured to form a mark for image adjustment, a conveyor member configured to convey the mark formed by the forming unit and a detecting unit configured to detect the mark conveyed by the conveyor member. Further, the image forming apparatus may include a removing unit configured to remove the mark conveyed by the conveyor member, from the conveyor member; and a control device. According to aspects of the disclosure, after the forming unit has formed a mark for image adjustment, the control device may be configured to determine whether the mark has been removed from the conveyor member and based on the determination of whether the mark has been removed from the conveyor member, begin printing of print data even when the mark has not been completely removed from the conveyor member.

21 Claims, 8 Drawing Sheets

IMAGE FORMING APPARATUS FOR PERFORMING IMAGE ADJUSTMENT THAT REDUCES TIME TO PRINT WHEN MARK FORMATION AND PRINTING ARE REQUIRED AT THE SAME TIME

CROSS-REFERENCE TO RELATED APPLICATION

This application claims priority from Japanese Patent Application No. 2011-064836, filed on Mar. 23, 2011, which is incorporated herein by reference.

FIELD OF DISCLOSURE

The disclosure relates to an image forming apparatus, and more specifically, an image forming apparatus that forms a mark for image adjustment on a conveyor member and adjust an image based on a measurement result of the mark.

BACKGROUND

A known image forming apparatus performs an image adjustment to prevent an occurrence of positional deviation of an image and a deviation of print density. In the image adjustment, for example, a mark for positional deviation adjustment (e.g., a registration pattern) is formed onto a conveyor member (e.g., a sheet conveyor belt) by each color of the image forming apparatus and an amount of deviation between registration patterns of reference colors and registration pattern of test subject colors is determined. Based on a correction value specified by the deviation amount, the positional deviation of images formed in the test subject colors is corrected.

Conventionally, the mark for image adjustment is formed on a belt after cleaning of the belt. After the mark is formed, the mark is measured and an image is adjusted.

SUMMARY

Conventionally, the mark used for image adjustment is formed on a conveyor member that is used during printing. Therefore, printing may be prevented during the mark formation or the mark measurement. Thus, it may take longer to produce a printed matter if the image forming apparatus starts forming the mark than it would if the image forming apparatus was not forming the mark.

An embodiment of the disclosure provides for an image forming apparatus which reduces the time to provide a print output when mark formation and printing are required to be performed at the same timing.

Aspects of the disclosure relate to an image forming apparatus which may include a forming unit configured to form a mark for image adjustment, a conveyor member configured to convey the mark formed by the forming unit and a detecting unit configured to detect the mark conveyed by the conveyor member. Further, the image forming apparatus may also include a removing unit configured to remove the mark conveyed by the conveyor member, from the conveyor member; and a control device. According to aspects of the disclosure, after the forming unit has formed a mark for image adjustment, the control device may be configured to adjust an image based on a detecting result of the detection performed by the detecting unit, define a blank area of the conveyor member along a rotating direction of the conveyor member on which no mark is present and determine whether a length of the blank area is greater than a length of a sheet to be used for a print job along a conveying direction of the sheet. Further, the control device may be configured to perform printing of the print data when the blank area is facing the forming unit and before the removing unit completes the removal of the mark when the control device determines that the length of the blank area is greater than the length of the sheet.

Further, aspects of the disclosure relate to an image forming apparatus which may include a forming unit configured to form a mark for image adjustment, a conveyor member configured to convey the mark formed by the forming unit and a detecting unit configured to detect the mark conveyed by the conveyor member. Further, the image forming apparatus may include a removing unit configured to remove the mark conveyed by the conveyor member, from the conveyor member; and a control device. According to aspects of the disclosure, after the forming unit has formed a mark for image adjustment, the control device may be configured to determine whether the mark has been removed from the conveyor member and based on the determination of whether the mark has been removed from the conveyor member, begin printing of print data even when the mark has not been completely removed from the conveyor member.

Also, aspects of the disclosure relate to an image forming apparatus which may include a forming unit for forming a mark for image adjustment, a conveyor for conveying the mark formed by the forming unit and a detector for detecting the mark conveyed by the conveyor. Further, the image forming apparatus may include a removing unit for removing the mark conveyed by the conveyor, from the conveyor and a control means for, after the forming unit has formed a mark for image adjustment, adjusting an image based on a detecting result of the detection performed by the detector. Further, according to aspects of the disclosure, after the forming unit has formed a mark for image adjustment, the control device may be configured to define a blank area of the conveyor along a rotating direction of the conveyor on which no mark is present, determine whether a length of the blank area is greater than a length of a sheet to be used for a print job along a conveying direction of the sheet and perform printing of the print data when the blank area is facing the forming unit and before the removing unit completes the removal of the mark when the control means determines that the length of the blank area is greater than the length of the sheet.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings.

DETAILED DESCRIPTION

Embodiments in which an image forming apparatus according to the aspects of the disclosure are implemented are now described in detail with reference to the accompanying drawings, like numerals being used for like corresponding parts in the various drawings. In the embodiment, the aspects of the disclosure may be applied to a multifunction peripheral device ("MFP") having a color printing function.

Figure 1:
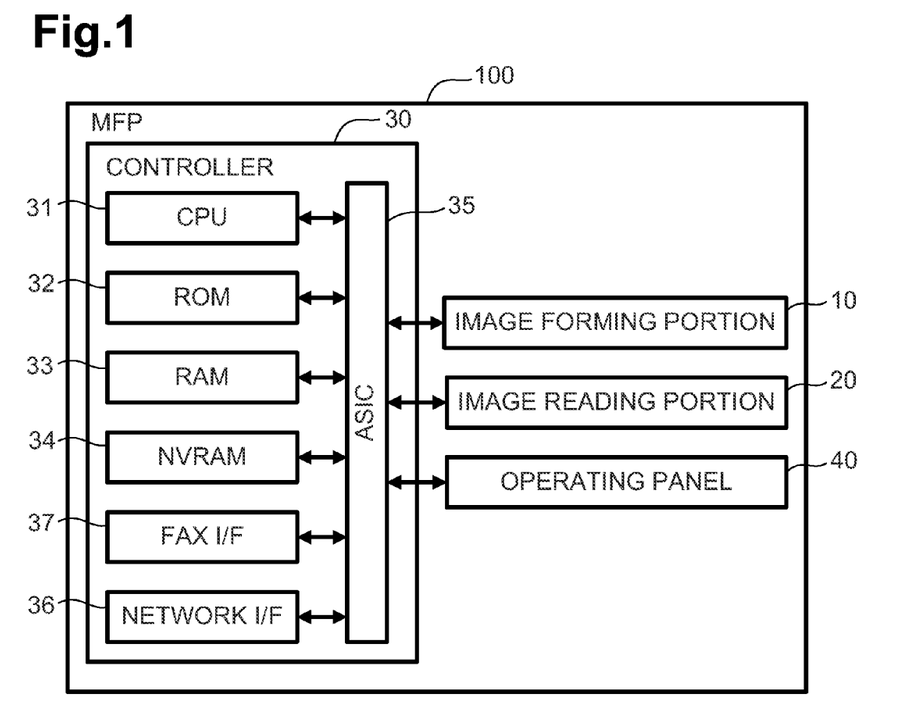
FIG. 1 is a block diagram depicting an electric configuration of a multifunction peripheral device in an embodiment according to one or more aspects of the disclosure.

As depicted in FIG. 1, an MFP 100 may comprise a controller 30 (an example of a determining unit, a print controlling unit, a mark-removal necessity determining unit, a detecting unit, a conveyance controlling unit, a failure detecting unit, and a measurement necessity determining unit) that may comprise a central processing unit ("CPU") 31, a read-only memory ("ROM") 32, a random-access memory ("RAM") 33, a nonvolatile random-access memory ("NVRAM") 34, an application-specific integrated circuit ("ASIC") 35, a network interface ("I/F") 36, and a facsimile interface ("FAX I/F") 37. Controller 30 may be electrically connected with an image forming portion 10, an image reading portion 20, and an operating panel 40. Image forming portion 10 may be configured to form an image onto a sheet. Image reading portion 20 may be configured to read an image from a document. Operating panel 40 (an example of an accepting unit) may be configured to display operating statuses and to accept a user's input operation.

CPU 31 may serve as a control center and may be configured to perform computations for accomplishing various functions, e.g., an image reading function, an image forming function, a facsimile data transmitting/receiving function, and a positional deviation adjusting function (described below), which may be performed in MFP 100. ROM 32 may store various control programs and settings for controlling MFP 100 as well as certain initial values. RAM 33 may be used as a workspace for temporarily storing the control programs read from ROM 32 or as a storage area for temporarily storing image data. NVRAM 34 may be used as a storage area for storing various settings and image data.

CPU 31 may control functions of each component or each portion of MFP 100 (e.g., a timing at which an exposure device, that constitutes image forming portion 10, irradiates light, and a timing at which drive motors for rollers constituting a sheet-conveying path are driven and stopped) via ASIC 35. Further, CPU 31 stores processing results in RAM 33 or NVRAM 34, in accordance with the control programs read from ROM 32 and signals sent from sensors 61.

Network interface 36 may be connected with a network that may allow MFP 100 to connect with another information processing device. FAX interface 37 may be connected with a telephone line that may allow MFP 100 to connect with a facsimile machine at another end of the telephone line. MFP 100 may perform data communications with external devices via network interface 36 or FAX interface 37.

An internal structure of image forming portion 10 (an example of a forming unit) of MFP 100 now is described with reference to FIG. 2. Image forming portion 10 may comprise a process portion 50, a fixing unit 8, a sheet feed tray 91, and a sheet discharge tray 92. Process portion 50 may form a toner image by an electrophotographic method and may transfer the toner image onto a sheet. Fixing unit 8 may fix the transferred toner onto the sheet. Sheet feet tray 91 may hold therein sheets to which images have not been transferred. Sheet discharge tray 92 may hold sheets on which images have been transferred. An image reading portion 20 may be disposed above image forming portion 10.

Process portion 50 may comprise process units 50C, 50M, 50Y, 50K. Image forming portion 10 may comprise an exposure unit 53, a conveyor belt 7, and a sensor 61, such as an optical sensor. Exposure unit 53 may irradiate each process unit 50C, 50M, 50Y, 50K with light. Conveyor belt 7 (an example of a conveyor member) may convey a sheet to a transfer position of each process unit 50C, 50M, 50Y, 50K. Sensor 61 (an example of a measuring unit) may measure a mark formed on conveyor belt 7.

A substantially S-shaped conveying path 11 (indicated by a dot and dashed line in FIG. 2) may be provided in image forming portion 10, such that a sheet, which may be loaded on sheet feed tray 91 at the bottom of image forming portion 10, may be guided to sheet discharge tray 92 through a sheet feed roller 71 (an example of a sheet feeding unit), a registration roller 72 (an example of a sheet conveying unit), process portion 50, fixing unit 8, and a discharge roller 76.

Process units 50C, 50M, 50Y, 50K may correspond to respective colors of cyan C, magenta M, yellow Y, and black K. Accordingly, process portion 50 may form an image in color. In process portion 50, process units 50C, 50M, 50Y, 50K may be disposed in parallel with each other. Specifically, process unit 50C may form an image in cyan C, process unit 50M may form an image in magenta M, process unit 50Y may form an image in yellow Y, and process unit 50K may form an image in black K. Process units 50C, 50M, 50Y, 50K may be separated from each other at regular intervals in a sheet-conveying direction.

Figure 3:
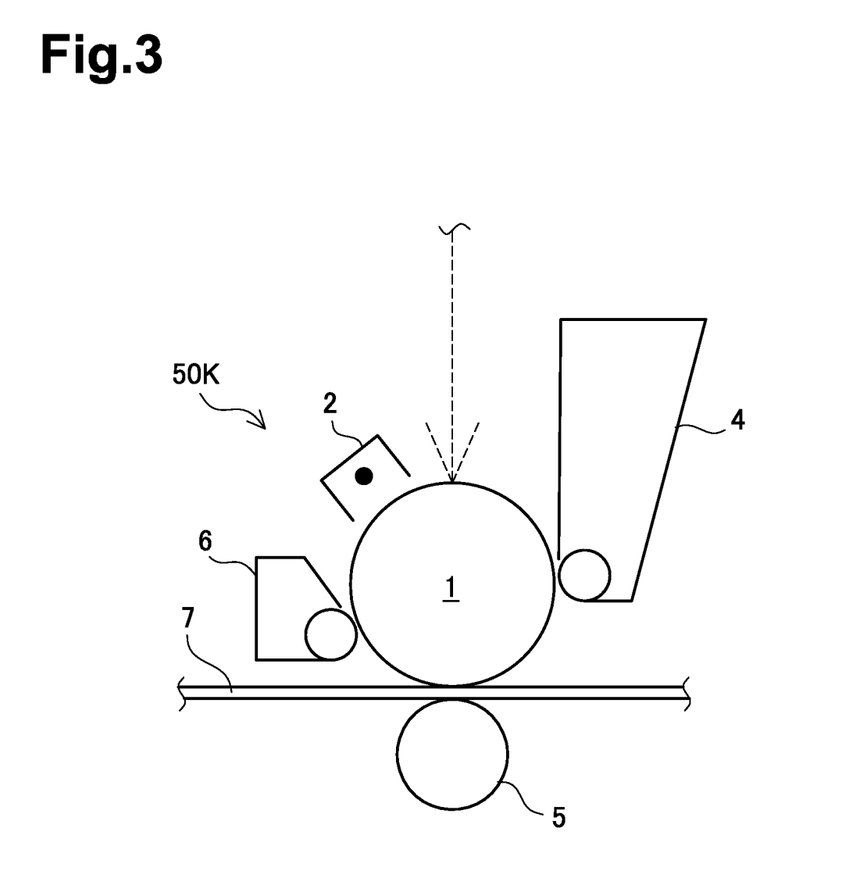
FIG. 3 is a schematic view depicting an internal structure of a process unit of the multifunction peripheral device of FIG. 1 in the embodiment according to one or more aspects of the disclosure.

A structure of process unit 50K now is described with reference to FIG. 3. Process unit 50K may comprise a drum-shaped photosensitive member 1, a charger 2, a developing unit 4, a transfer unit 5, and a cleaner 6. Charger 2 may uniformly charge a surface of photosensitive member 1. Developing unit 4 may develop an electrostatic latent image by using toner. Transfer unit 5 may transfer a toner image formed on photosensitive member 1 onto a sheet. Cleaner 6 may electrically catch toner remaining on photosensitive member 1 after transfer unit 5 transfers a toner image onto the sheet from the surface of photosensitive member 1. Photosensitive member 1 and transfer unit 5 may be in contact with conveyor belt 7 and may be disposed on opposite sides of conveyor belt 7 while sandwiching conveyor belt 7 therebetween. Process units 50C, 50M, 50Y may have the same structure as process unit 50K described above.

In each process unit 50C, 50M, 50Y, 50K, the surface of photosensitive member 1 may be charged uniformly by charger 2. Then, the surface of photosensitive member 1 then may be exposed to light from exposure unit 53. In this manner, an electrostatic latent image of an image to be formed on a sheet may be formed on the surface of photosensitive member 1. After that, developing unit 4 may supply toner to photosensitive member 1. Thus, the electrostatic latent image formed on photosensitive member 1 may become a toner image.

In image forming portion 10, sheet feed roller 71 may pick up a sheet loaded in sheet feed tray 91 and may convey the sheet to registration roller 72. Registration roller 72 may convey the sheet onto conveyor belt 7. Then, transfer unit 5 may transfer a toner image formed in process portion 50 onto the sheet. In a color printing process, each process unit 50C, 50M, 50Y, 50K may form a toner image, and the formed toner images may overlap on the sheet when transferred to form the color image. In a monochrome printing process, process unit 50K alone may form a toner image which transfer unit 5 may transfer onto the sheet. After transfer unit 5 transfers the toner image onto the sheet, conveyor belt 7 may convey the sheet to fixing unit 8. Fixing unit 8 thermally may fix the color or monochrome toner image onto the sheet. Then, the sheet having the fixed toner image may be discharged onto sheet discharge tray 92.

Conveyor belt 7 may be an endless belt member wound around conveyor rollers 73, 74 (See FIG. 2) and may be made of resin material, e.g., polycarbonate. Conveyor roller 74 may be a drive roller that is driven by a drive motor 75. Conveyor belt 7 may rotate in a counterclockwise direction in FIG. 2 when conveyor roller 74 rotates. With this rotation, conveyor belt 7 may convey a sheet placed on a surface thereof from registration roller 72 to fixing unit 8. Conveyor roller 73 may rotate by following the rotation of conveyor belt 7.

Sensor 61 may be disposed downstream of process units 50C, 50M, 50Y, 50K in a rotating direction of conveyor belt 7. Sensor 61 may detect marks that are formed by process units 50C, 50M, 50Y, 50K and that are transferred onto conveyor belt 7.

Figure 4:
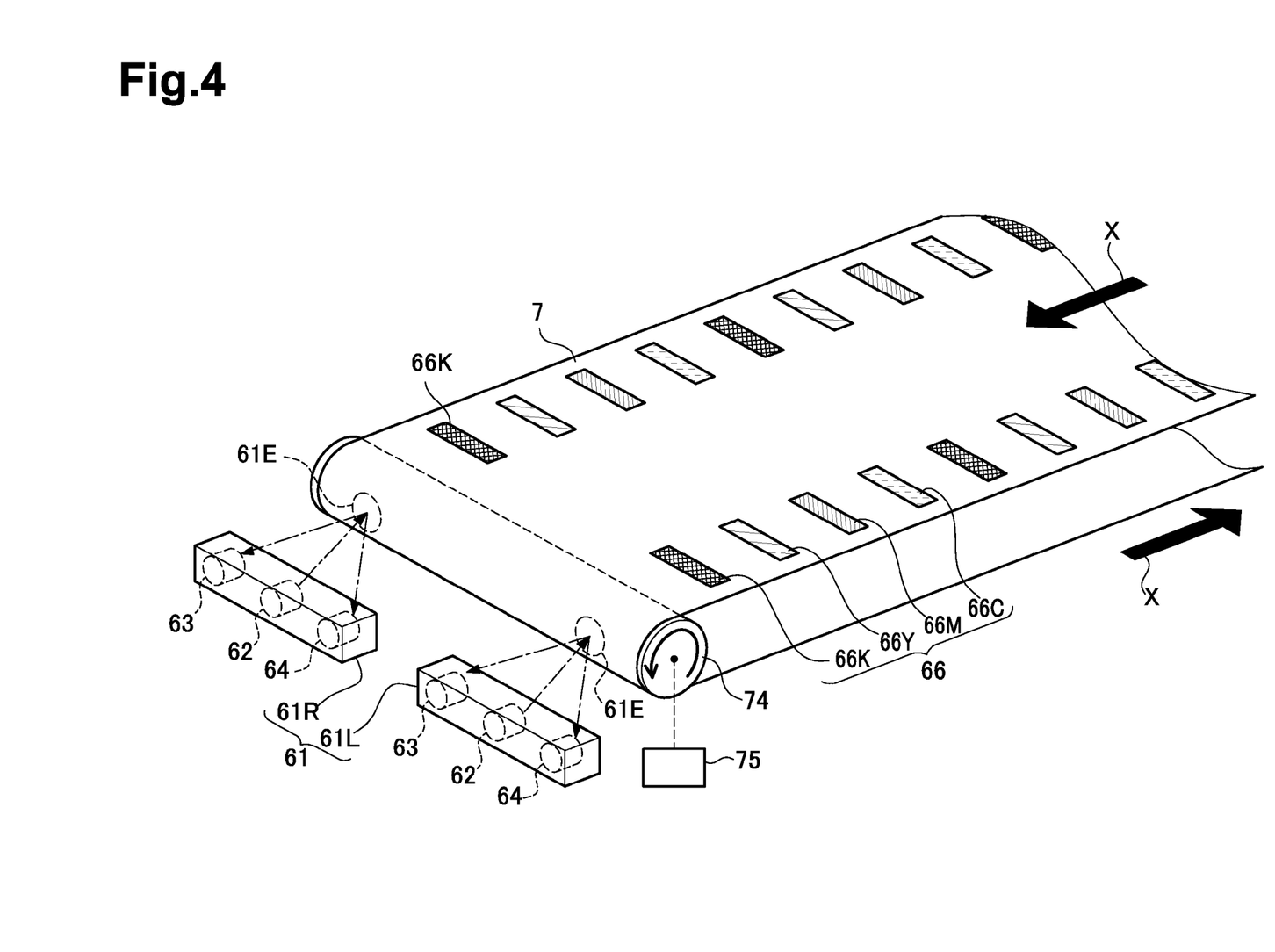
FIG. 4 depicts an exemplary arrangement of mark sensors and marks for positional deviation correction in the embodiment according to one or more aspects of the disclosure.

More specifically, as depicted in FIG. 4, sensor 61 may comprise a plurality of, e.g., two, sensors 61R, 61L arranged side by side in a width direction of conveyor belt 7. Sensor 61R may be disposed at a right side of conveyor belt 7 in the width direction, and sensor 61L may be disposed at a left side of conveyor belt 7 in the width direction. Each of sensors 61R, 61L may be a reflection type optical sensor, and each of sensors 61R, 61L may comprise a light-emitting element 62, e.g., a light-emitting diode (LED), and light receiving elements 63, 64, e.g., a phototransistor. In each sensor 61R, 61L, light-emitting element 62 may irradiate the surface of conveyor belt 7 (e.g., a measurement position 61E indicated by a dashed line in FIG. 4) with light from an oblique direction, and light receiving element 63 may receive specular reflection light from the surface of conveyor belt 7 and light receiving element 64 may receive diffuse reflection light from the surface of conveyor belt 7.

A mark 66 may comprise a group of marks 66C, 66M, 66Y, 66K, which respective process units 50C, 50M, 50Y, 50K may form and which transfer unit 5 may transfer onto conveyor belt 7. Referring to FIG. 4, conveyor belt 7 may convey mark 66 in a conveying direction indicated by an arrow X as conveyor belt 7 rotates. Sensor 61 may detect mark 66 based on a difference between an amount of received light reflected from mark 66 formed on the surface of conveyor belt 7 and an amount of received light directly reflected from the surface of conveyor belt 7.

Figure 2:
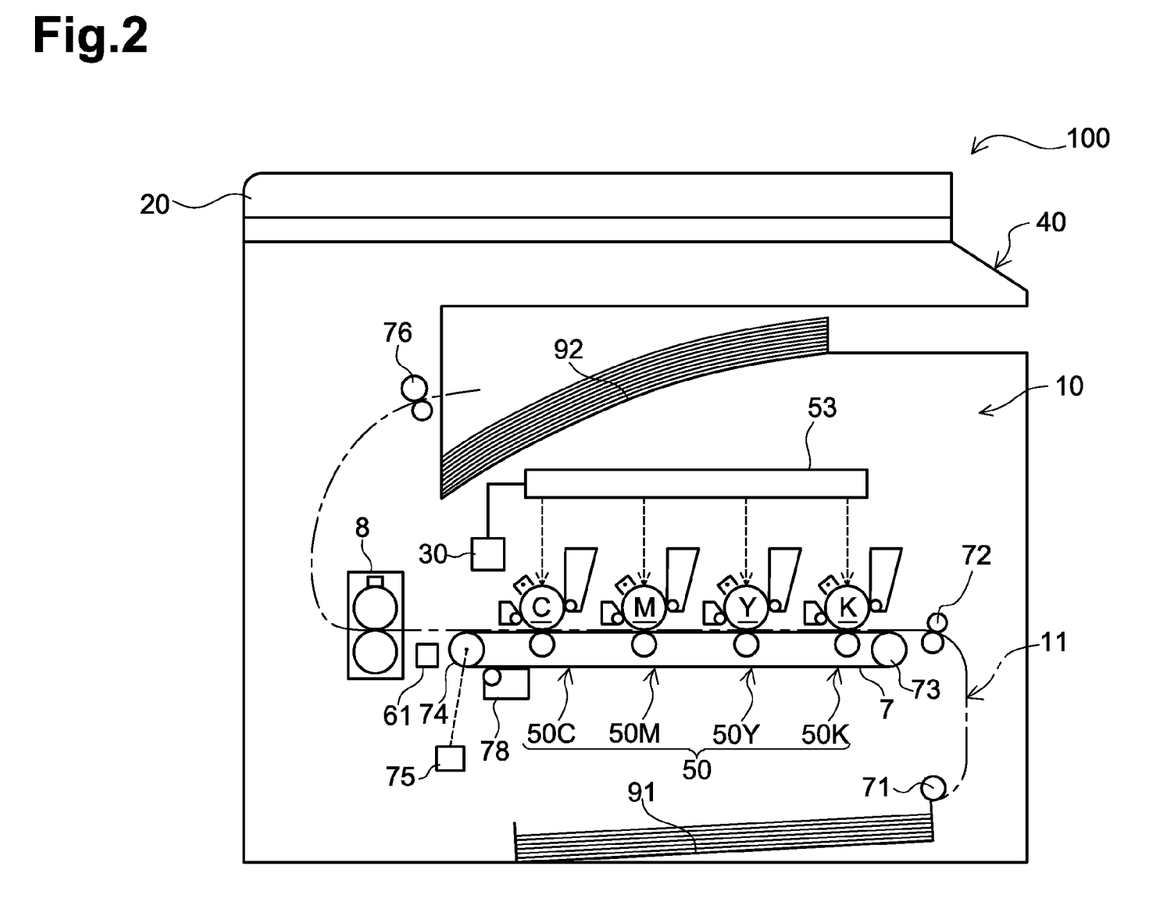
FIG. 2 is a schematic view depicting an internal structure of an image forming portion of the multifunction peripheral device of FIG. 1 in the embodiment according to one or more aspects of the disclosure.

In image forming portion 10, a belt cleaner 78 (an example of a removing unit) may be disposed in contact with conveyor belt 7 to remove toner adhering to conveyor belt 7 as depicted in FIG. 2. Belt cleaner 78 may remove mark 61 that has passed measurement position 61E where sensor 61 may measure mark 66.

Hereinafter, a positional deviation correcting process of MFP 100 is described. The positional deviation correcting process may comprise a correction value obtaining process, in which an amount of deviation (a correction value) of each reference color is obtained, and a correcting process, in which an image is corrected based on the correction value obtained in the correction value obtaining process. The correction value obtaining process may be performed if certain criteria for performance are met. The criteria for performance may be the number of pages printed from the previous correction value obtaining process, the time that elapsed since power was applied to MFP 100, temperature, and the detection of vibration. The correcting process may be performed, for example, every printing.

In the correction value obtaining process, first, each process unit 50C, 50M, 50Y, 50K may form a pattern image for positional deviation correction 66, e.g., a registration pattern, onto each end portion of conveyor belt 7, i.e., a position where each of sensors 61R, 61L can read registration pattern 66.

More specifically, as depicted in FIG. 4, registration pattern 66 may comprise the group of marks 66C, 66M, 66Y, 66K, which respective process units 50C, 50M, 50Y, 50K may form with arranging marks 66C, 66M, 66Y, 66K in the sheet-conveying direction. The group of marks 66C, 66M, 66Y, 66K may comprise a plurality of sets of marks 66C, 66M, 66Y, 66K, and each set may comprise each one of marks 66C, 66M, 66Y, 66K. Hereinafter, the group of marks 66C, 66M, 66Y, 66K may be referred to as registration pattern 66.

Registration pattern 66 may be formed on conveyor belt 7 along the sheet-conveying direction (the rotating direction of conveyor belt 7 depicted in FIG. 4) at predetermined timings. Each of marks 66C, 66M, 66Y, 66K may have a strip-shape. Each of marks 66C, 66M, 66Y, 66K may be arranged such that its longer sides may extend in a belt-width direction (a direction perpendicular to the sheet-conveying direction).

Next, based on binary signals outputted from sensor 61, a position of each of marks 66C, 66M, 66Y, 66K may be detected. Then, an interval between a mark of the reference color, e.g., mark 66K and each mark of adjustment color, e.g., marks 66C, 66M, 66Y, in the sheet-conveying direction, may be determined by calculation. The interval between the mark of the reference color and the mark of the adjustment color may vary due to the positional deviation in the sheet-conveying direction. Therefore, the amount of deviation of the mark of the adjustment color in the sheet-conveying direction can be identified relative to the position of the mark of the reference color.

In the correcting process, based on the amount of deviation obtained in the correction value obtaining process, a process condition, e.g., exposure positions, and the rotating speed of conveyor belt 7 and photosensitive members 1, may be adjusted such that the positions at which images in the adjustment colors are to be formed may coincide with the position at which an image in the reference color is to be formed.

The above-described constitution of registration pattern 66 is merely exemplary and the disclosure is not limited to the constitution of registration pattern 66. The registration pattern may be a common pattern image used for positional deviation correction. For example, the registration pattern may comprise pairs of strip-shaped marks. In each pair, one of the strip-shaped marks may extend in the belt-width direction perpendicular to the sheet-conveying direction, and another of the strip-shaped marks may be inclined by a predetermined angle with respect to the belt-width direction. An amount of deviation in the belt-width direction can be identified by using the pair of strip-shaped marks.

Figure 5:
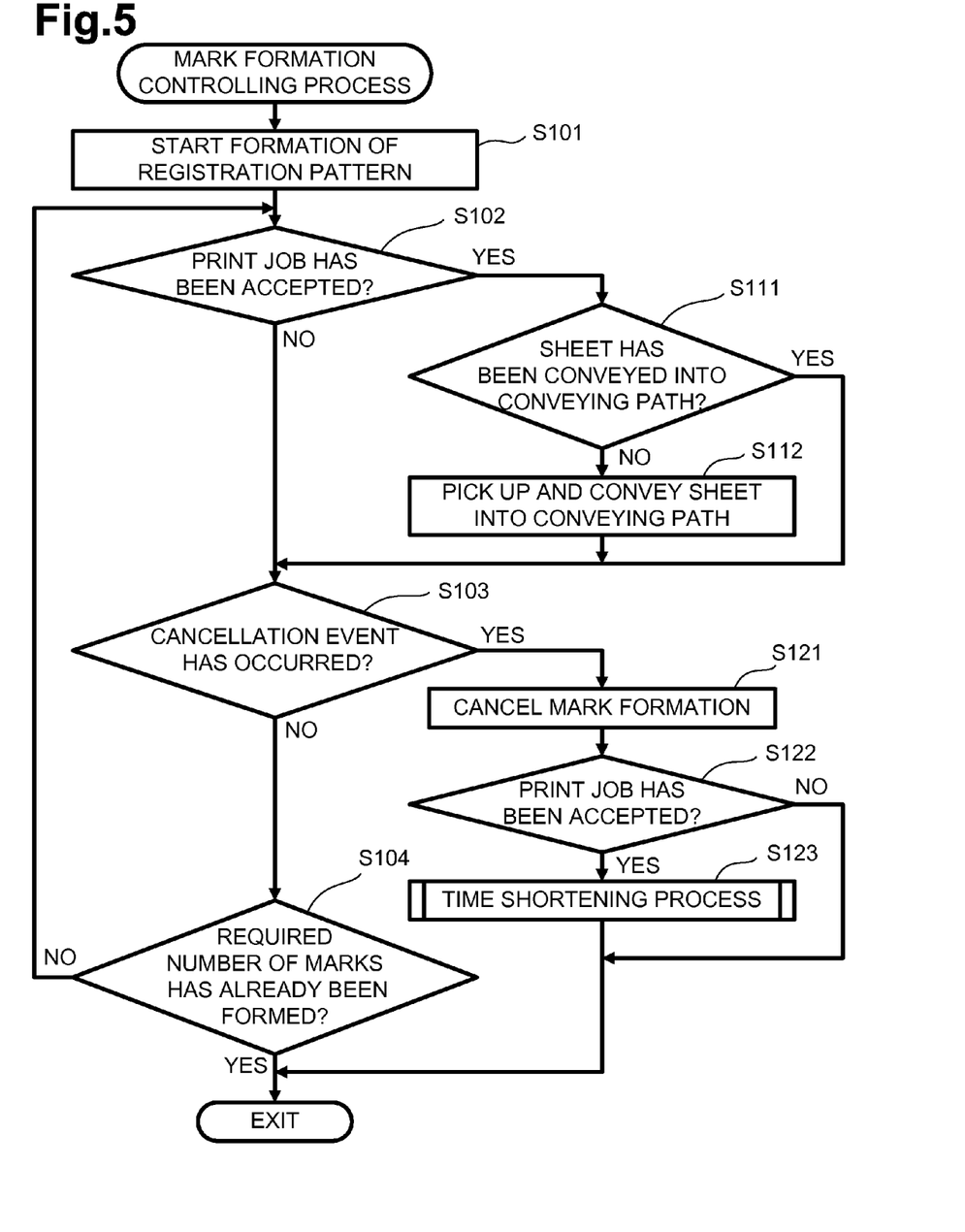
FIG. 5 is a flowchart depicting a mark formation controlling process to be performed in the multifunction peripheral device in the embodiment according to one or more aspects of the disclosure.

Hereinafter, a mark formation controlling process now is described with reference to FIG. 5. In the mark formation controlling process, a start and stop of the formation of the mark for positional deviation correction may be controlled. Controller 30 of MFP 100 may perform the mark formation controlling process if the criteria for performance of the correction value obtaining process in the positional deviation correction are met.

In the mark formation controlling process, first, controller 30 may start the formation of registration pattern 66, which may be the mark for positional deviation correction, in the process portion 50 (step S101). Sensor 61 may read marks 66C, 66M, 66Y, 66K constituting registration pattern 66. Based on the readings from sensor 61, controller 30 may identify the amount of deviation.

Then, controller 30 may determine whether a print job has been accepted since the mark formation started (step S102). That is, controller 30 may determine whether a print job has been accepted while conveyor belt 7 is conveying registration pattern 66 formed thereon.

When a print job has been accepted (step S102: YES), controller 30 may determine whether a sheet has been sent into the conveying path 11 (step S111). When a sheet has not yet been sent into the conveying path 11 (step S111: NO), controller 30 may drive sheet feed roller 71 to pickup and convey a sheet from the sheet tray 91 and then stop the sheet conveyance while registration roller 72 holds the sheet (step S112). That is, a first sheet may be conveyed to a position immediately in front of process portion 50 and held in the position to wait. By doing so, a waiting time for the sheet conveyance may be shortened and printing can be started immediately upon receipt of a print instruction. When a sheet has been sent into the conveying path 11 (step S111: YES), the routine moves to step S103. Once a sheet is picked up, a sheet pickup may not be needed even when a next print job is accepted.

When a print job has not been accepted (step S102: NO) or when the sheet pickup in step S112 has been finished, controller 30 may determine whether an event for cancelling the mark formation has occurred (step S103). The cancellation event may be, for example, a failure in the measurement of the mark by sensor 61. When the surface of conveyor belt 7 is damaged, sensor 61 may mistakenly detect the damaged portion of conveyor belt 7 as a mark. If the positional deviation correction is performed by using a correction value obtained by the detection of the damaged portion, the quality of an image may not be improved. Accordingly, MFP 100 may store an assumed range of deviation in ROM 32. When controller 30 obtains a deviation out of the assumed range, controller 30 may determine that the mark measurement failed and may cancel the mark formation.

Another cancellation event may be, for example, a case where a deviation of marks can be determined before all of the required number of marks are formed. For example, in a case where one hundred (100) marks are formed for each color in a single mark formation instruction and deviations are calculated based on measured values of each color, when a predetermined number or more of the measured values of each mark are successively the same values (not only precisely the same value but also including approximate values), it is conceivable that the same result may be obtained if the further mark formation is performed. Therefore, when the predetermined number or more of the measured values of each mark are successively the same values, controller 30 may cancel the further mark formation and permit printing to be performed.

When a predetermined number or more of appropriate values are successively measured from the first mark, controller 30 can determine that the positional deviation has not occurred if the further mark formation is cancelled. Therefore, when the predetermined number or more of appropriate values are successively measured from the first mark, the further mark formation may be cancelled. An assumed range, in which normal values may be specified, may be provided to determine whether the measured value is appropriate. When the measured value is within the assumed range, controller 30 can determine that the measured value is an appropriate value.

Other cancellation event may be, for example, a user's input of a forced-cancellation instruction. MFP 100 may comprise a button that may allow the user to input a forced-cancellation instruction, on the operating panel 40. MFP 100 may accept the forced-cancellation instruction by the pressing of the button by the user. Alternatively, MFP 100 may comprise, for example, a button that may allow the user to input a print instruction of a print job on standby to provide an indirect instruction, instead of the button for inputting the forced-cancellation instruction to provide a direct instruction. That is, during mark formation, when controller 30 detects the pressing of the button for inputting a print instruction of a print job, controller 30 may cancel the mark formation and perform printing of the print job first.

Controller 30 may determine whether at least one of the above-described cancellation events has occurred (step S103). When at least one of the cancellation events has occurred (step S103: YES), controller 30 may determine that the cancellation event that interrupts the mark formation has occurred.

When no cancellation event has occurred (step S103: NO), controller 30 may determine whether the required number of marks has already been formed (step S104). When the required number of marks has not yet been formed (step S104: NO), the routine may move to step S102 to continue the mark formation. When the required number of marks has already been formed (step S104: YES), controller 30 may exit the mark formation control process.

When one or more cancellation events have occurred (step S103: YES), controller 30 may cancel the mark formation in process portion 50 (step S121). Controller 30 may determine whether a print job was accepted after the mark formation had started (step S122). When no print job was accepted (step S122: NO), controller 30 may exit the mark formation controlling process.

Figure 6:
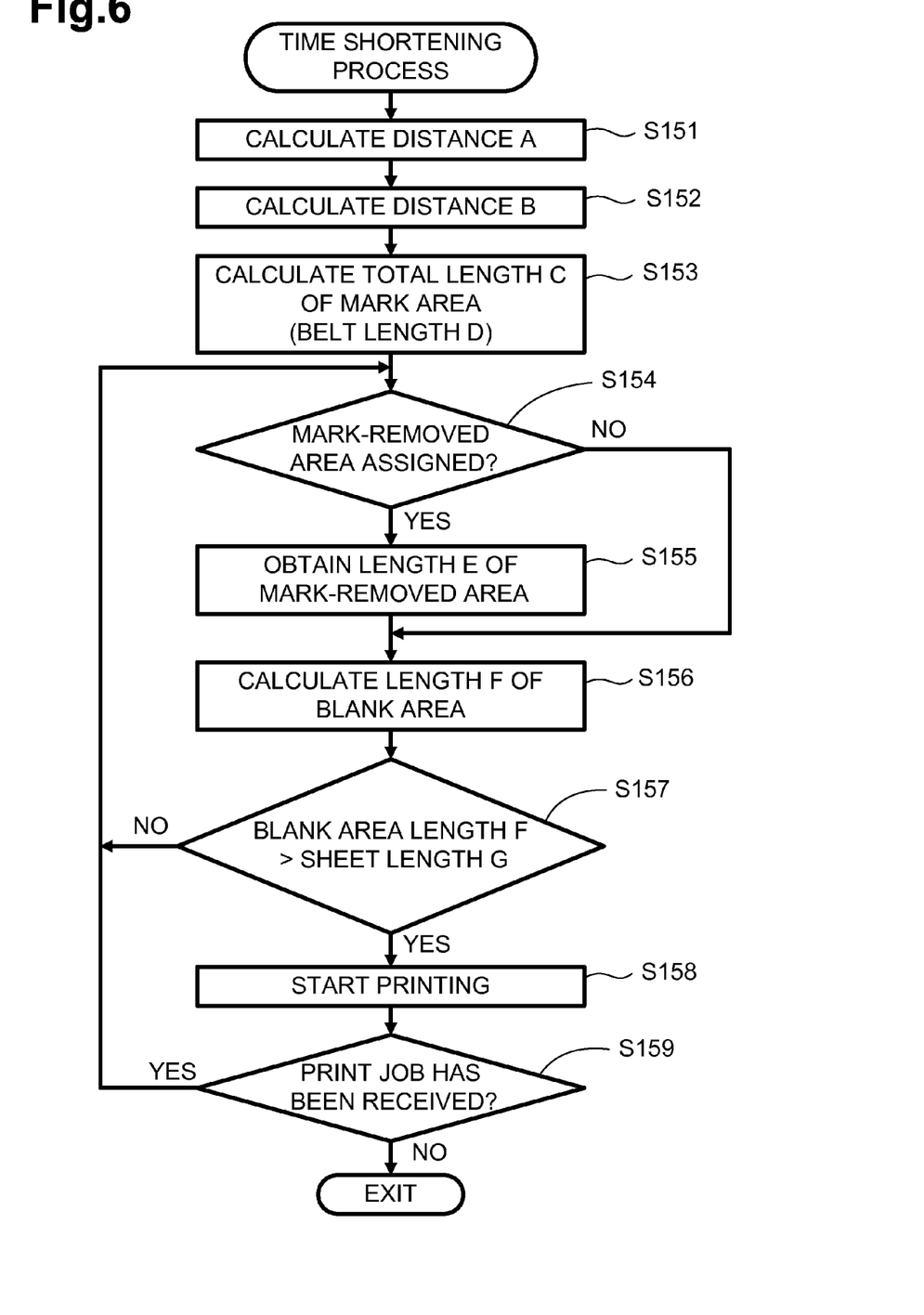
FIG. 6 is a flowchart depicting a time shortening process to be performed in the multifunction peripheral device in the embodiment according to one or more aspects of the disclosure.
Figure 7:
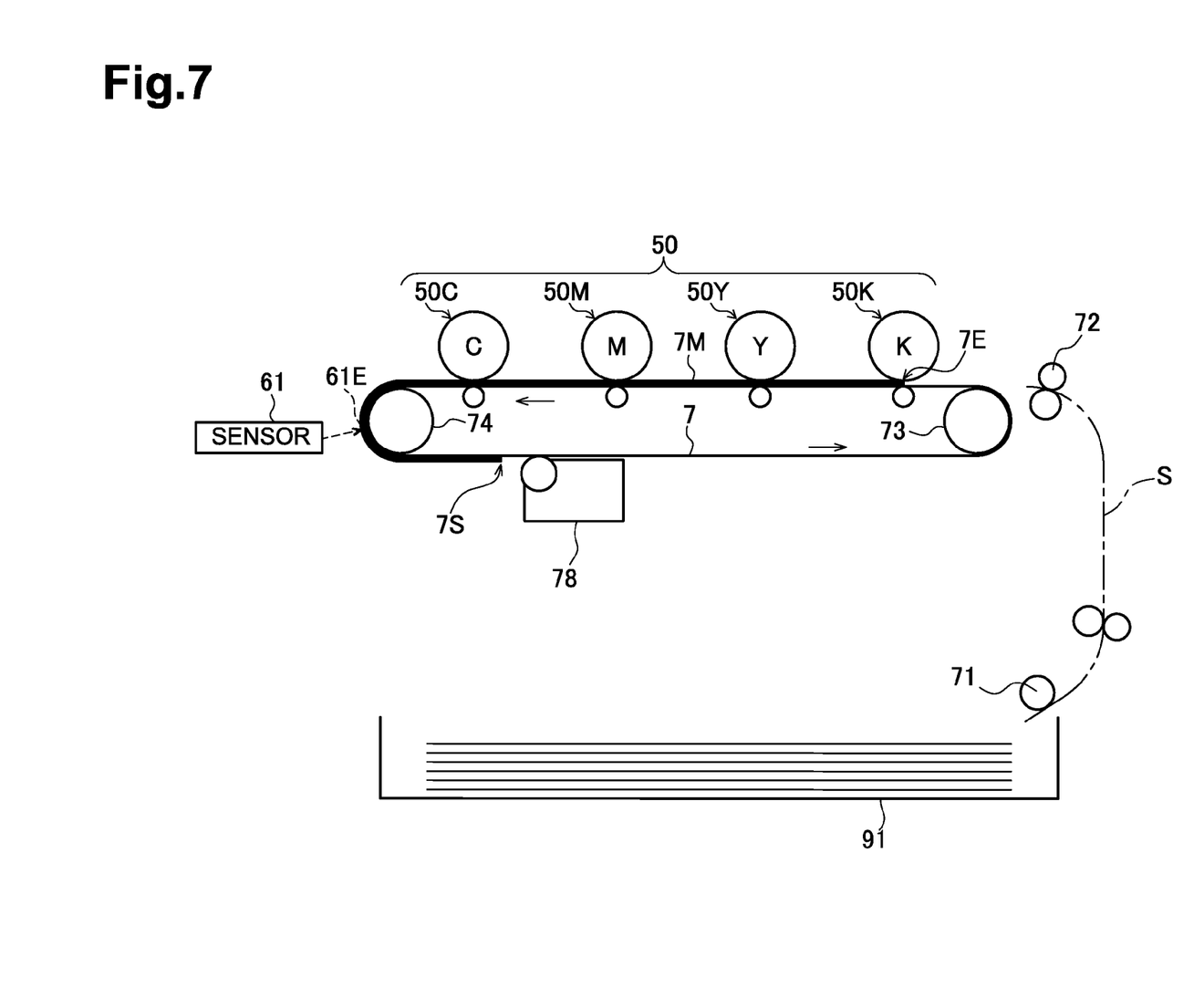
FIG. 7 depicts a relationship between a length of a sheet and a length of a mark formed area in the embodiment according to one or more aspects of the disclosure.

When a print job was accepted (step S122: YES), controller 30 may perform a time shortening process, in which a print start timing is controlled (step S123). Hereinafter, the time shortening process in step S123 to be performed by MFP 100 is now described with reference to FIGS. 6 and 7. In FIG. 7, a thick-line part of conveyor belt 7 may be an area in which marks are formed on conveyor belt 7 and may be referred to as a mark area 7M hereinafter.

In the time shortening process, first, controller 30 may calculate a length A between a leading edge 7S of mark area 7M along the rotating direction of conveyor belt 7 and measurement position 61E in mark area 7M, based on an elapsed time since sensor 61 detected leading edge 7S of mark area 7M and the rotating speed of conveyor belt 7 (step S151).

Next, controller 30 may calculate a length B between a mark that is formed in a farthest location from measurement position 61 of sensor 61 i.e., a trailing edge 7E of mark area 7M, and the measurement position 61E of sensor 61 (step S152).

Then, controller 30 may calculate a total length C of mark area 7M in conveyor belt 7 along the rotating direction of conveyor belt 7 by adding length B obtained in step S152 to length A obtained in step S151 (step S153). A circumference of conveyor belt 7 may be referred to as a belt length D, which may be a design value stored in ROM 32 of MFP 100.

After that, controller 30 may determine whether a clean area where belt cleaner 78 removed the marks from mark area 7M (hereinafter, referred to as a mark-removed area) has been defined in mark area 7M (step S154). MFP 100 may perform a cleaning completion determining process (e.g., once per one rotation of conveyor belt 7), in which controller 30 may determine whether the mark removal by belt cleaner 78 has been completed In the cleaning completion determining process, controller 30 may define the mark-removed area. The cleaning completion determining process may be described later in detail.

When the mark-removed area has been defined (step S154: YES), controller 30 may obtain a length E of the mark-removed area in conveyor belt 7, i.e., a length of an area in which the marks were completely removed after the mark formation had been cancelled, along the rotating direction of conveyor belt 7 (step S155). An initial value of length E may be zero (0).

After step S155 or when the mark-removed area has not yet been defined (step S154: NO), controller 30 may calculate a length F of an area in which there is no mark on conveyor belt 7 (hereinafter, referred to as a blank area) along the rotating direction of conveyor belt 7 (step S156). More specifically, length F of the blank area may be obtained using Expression below.

$$\text{Blank area length } F = \text{Length } D - \text{Length } C + \text{Length } E \qquad \text{Expression}$$

Controller 30 may determine whether length F of the blank area in conveyor belt 7 is greater than a length G of a sheet S along the sheet-conveying direction (step S157), i.e., controller 30 may determine whether there is a required space for printing on conveyor belt 7. Controller 30 may obtain length G of a sheet S from the settings of the print job or from the settings of the sheet feed cassette 91. A sensor may be disposed in the conveying path 11 to detect a sheet length and controller 30 may calculate length G based on a signal from the sensor. That is, length G may vary based on a size of a sheet S to be used. When length G of a sheet S is greater than or equal to length F (step S157: NO), the routine may move to step S154 and controller 30 may not start until the requirement of step S157 is satisfied.

When blank area length F is greater than sheet length G (step S157: YES), controller 30 may start printing by using the blank area (step S158). In this embodiment, controller 30 may start forming an image at a timing that a leading edge of the blank area and a leading edge of a sheet S are aligned with each other. By doing so, although the marks still remain on conveyor belt 7, i.e., all of the marks have not been removed from conveyor belt 7, controller 30 may perform printing by using the blank area where there is no mark.

After controller 30 waited the completion of the printing of the (first) print job, controller 30 may determine whether a next (second) print job has been accepted before the printing of the (first) print job was completed (step S159). When the next (second) print job has been accepted (step S159: YES), the routine may move to step S154 and controller 30 may control a print start timing of the next (second) print job. When the next (second) print job has not been accepted (step S159: NO), controller 30 may exit the time shortening process. Then, controller 30 may go back to the mark formation controlling process of FIG. 5 and exit the mark formation controlling process.

After controller 30 started the mark formation in step S101 of the mark formation controlling process, controller 30 may perform the correction value obtaining process, in which sensor 61 may measure the marks and controller 30 may obtain correction values for positional deviation correction, at the same time frame. That is, the mark formation controlling process and the correction value obtaining process may be performed at the same time period. After printing starts in step S158 of the time shortening process, controller 30 may perform an image forming process. That is, the mark formation controlling process and the image forming process may be performed at the same time period. In the image forming process, controller 30 may perform an image adjustment using the correction values obtained in the correction value obtaining process.

Figure 8:
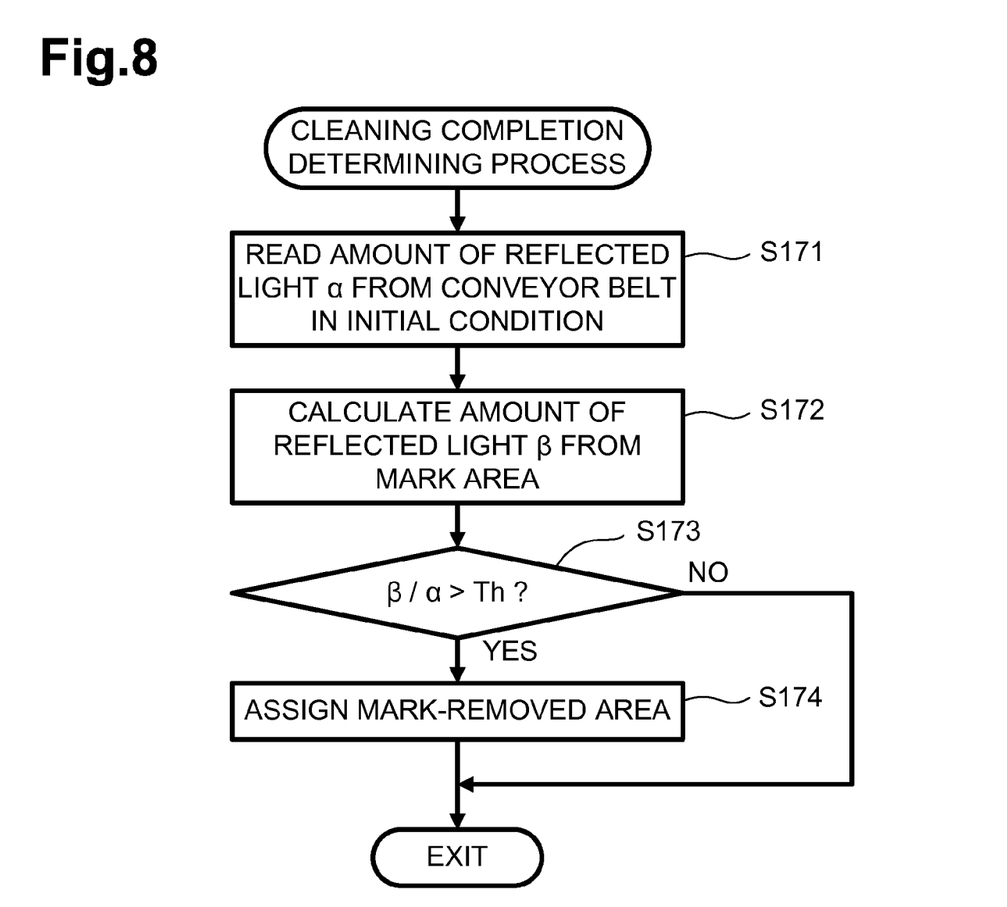
FIG. 8 is a flowchart depicting a cleaning completion determining process in the embodiment according to one or more aspects of the disclosure.

The cleaning completion determining process, in which the mark-removed area is assigned, is described with reference to FIG. 8. Controller 30 of MFP 100 may perform the cleaning completion determining process when sensor 61 again detects leading edge 7S of mark area 7M after leading edge 7S of mark area 7M passed the belt cleaner 78.

Belt cleaner 78 may completely remove all of the marks from conveyor belt 7 by one or more rotations of conveyor belt 7. Therefore, MFP 100 may perform the cleaning completion determining process every time sensor 61 detects leading edge 7S of mark area 7M.

In the cleaning completion determining process, first, controller 30 may read an amount of reflected light $\alpha$ from conveyor belt 7 on which a mark has not ever been formed, i.e., an amount of reflected light $\alpha$ from conveyor belt 7 in an initial condition, from ROM 32 (step S171). Amount of reflected light $\alpha$ may be a difference obtained by reducing an amount of diffuse reflection light received by light-receiving element 64 from an amount of specular reflection light received by light-receiving element 63. Amount of reflected light $\alpha$ may be measured before shipment and may be stored in ROM 32.

The amount of reflected light from conveyor belt 7 may decrease in accordance with duration of use of conveyor belt 7. Therefore, for an age-deterioration countermeasure, a value obtained by multiplying a weighting factor corresponding to the age-deterioration by amount reflected light $\alpha$ may be obtained as the amount of reflected light in step S171.

Next, controller 30 may calculate an amount of reflected light $\beta$ from mark area 7M (step S172). More specifically, controller 30 may obtain the amount of specular reflection light obtained from light-receiving element 63 and the amount of diffuse reflection light obtained from light-receiving element 64 of sensor 61 and may calculate amount of reflected light $\beta$ by reducing the amount of diffuse reflection light from the amount of specular reflection light.

Controller 30 may determine whether a ratio of actual amount of reflected light $\beta$ and initial amount of reflected light $\alpha$ (which may be equal to the amount of reflected light from the blank area), i.e., a value obtained by dividing amount of reflected light $\beta$ by amount of reflected light $\alpha$, is greater than a threshold value Th (step S173). Threshold value Th may be smaller than 1 (one). If toner is present on conveyor belt 7, the amount of diffuse reflection light may increase and amount of reflected light $\beta$ may be smaller. Therefore, the value obtained by dividing amount of reflected light $\beta$ by amount of reflected light $\alpha$ may also become smaller. Accordingly, when the value obtained by dividing amount of reflected light $\beta$ by amount of reflected light $\alpha$ may be smaller, controller 30 may determine that the mark removal is not completed.

When the value obtained by dividing amount of reflected light $\beta$ by amount of reflected light $\alpha$ is greater than threshold value Th (step S173: YES), controller 30 may determine that the mark removal has been completed. Then, controller 30 may define entire mark area 7M as the mark-removed area (step S174). More specifically, controller 30 may store the presence of the mark-removed area and a length E of the mark-removed area along the rotating direction of conveyor belt 7, into NVRAM 34. After step S174, controller 30 may exit the cleaning completion determining process.

When the value obtained by dividing amount of reflected light β by amount of reflected light α is smaller than or equal to threshold value Th (step S173: NO), controller 30 may determine that the mark removal is not completed. Therefore, controller 30 may exit the cleaning completion determining process without defining the mark-removed area.

When all of the marks formed in mark area 7M are completely removed therefrom, controller 30 may define the entire area of mark area 7M as the mark-removed area. Alternatively, in other embodiments, when some of the marks formed in mark area 7M are removed therefrom, controller 30 may assign the area from which the marks were removed, as the mark-removed area.

For example, controller 30 may divide mark area 7M into a plurality of regions and may determine whether the mark removal has been completed by each region. Controller 30 may define one or more regions in which the mark removal has been completed from the leading edge of mark area 7M, as the mark-removed area. By doing so, MFP 100 can perform printing as soon as possible if the length of the blank area becomes greater than the length of a sheet to be used, although all of the marks formed in mark area 7M have not been removed. That is, MFP 100 can perform printing without waiting the completion of the mark removal of the entire area of mark area 7M.

As described above, after cancelling the formation of registration pattern 66, MFP 100 according to the embodiment may perform printing immediately by using the blank area without waiting the completion of the mark removal of all marks of registration pattern 66 when controller 30 determines that the length of the blank area of conveyor belt 7 is greater than the length of the sheet to be used. By doing so, MFP 100 can start printing as soon as possible when permitted and thus produce a printed matter earlier than an image forming apparatus that may start printing after all of the marks of registration pattern 66 are completely removed.

MFP 100 according to such an embodiment of the disclosure may start printing before all of the marks of registration pattern 66 are removed from conveyor belt 7. Accordingly, MFP 100 may shift the process from the formation of registration pattern 66 to the printing of print data without stopping the rotation of conveyor belt 7. Accordingly, a load on conveyor belt 7 may become lower than a configuration in which conveyor belt 7 may be stopped when the formation of registration pattern 66 is cancelled.

While the disclosure has been described in detail with reference to the specific embodiment thereof, it would be apparent to those skilled in the art that various changes, arrangements and modifications may be applied therein without departing from the spirit and scope of the disclosure. For example, the image forming apparatus may not be limited to the multifunction peripheral device but may be applied to any devices having a printing function, e.g., printers, copying machines, facsimile machines. The printing method of the image forming apparatus may not be limited to the electrophotographic method but may be an inkjet method.

According to the above-described embodiment, in MFP 100, conveyor belt 7 may convey a sheet and process portion 50 may directly transfer images onto the sheet. However, the disclosure may not be limited to the specific embodiment. For example, in other embodiments, an intermediate transfer belt may be disposed and images may be transferred onto a sheet via the intermediate transfer belt. If the intermediate transfer belt is adopted, the belt cleaner may be separated from the intermediate transfer belt when MFP 100 starts printing in step S158.

In the above-described embodiment, registration pattern 66 may be formed on the both end portions of conveyor belt 7 in the belt-width direction. Nevertheless, in other embodiments, for example, registration pattern 66 may be formed on either of the end portions of conveyor belt 7 in the belt-width direction. In this case, sensor 61 may comprise a single sensor that may be disposed on the side at which registration pattern 66 may be formed.

In the above-described embodiment, the mark for positional deviation correction may be formed as the registration pattern. However, the registration pattern may not be limited to the mark for positional deviation correction. For example, in other embodiments, the registration pattern may be used for a mark for color-density adjustment.

In the above-described embodiment, the four process units 50C, 50M, 50Y, 50K may form the marks for image adjustment. However, the number of process units to be provided may not be limited to the specific embodiment. For example, in other embodiments, a single process unit may form marks for image adjustment.

In the above-described embodiment, the single sheet feed tray 91 may be disposed. Nevertheless, in other embodiments, for example, a plurality of sheet feed trays may be disposed. In addition, the plurality of sheet feed trays may feed sheets of different sizes.

In the above-described embodiment, controller 30 may determine the completion of the mark removal based on the surface condition of conveyor belt 7 obtained by sensor 61. However, the surface condition of conveyor belt 7 may not need to be measured. That is, a condition for completing the mark removal may be specified in advance. For example, it may be specified that the mark removal may be completed when the number of rotations of the belt reaches a predetermined number. However, the cleaning performance of belt cleaner 78 may vary due to various conditions, e.g., temperature, moisture, toner conditions, or belt surface conditions. Therefore, as described in the above embodiment, controller 30 can appropriately determine the completion of the mark removal by actually measuring the surface condition of conveyor belt 7 by sensor 61. If the condition for completing the mark removal is specified in advance, the predetermined number of rotations may be set to be greater number than actually-required number of rotations for safety. On the other hand, when the surface condition of conveyor belt 7 is actually measured by sensor 61, MFP 100 can start printing immediately after the mark removal is completed.

In the above-described embodiment, sensor 61 may measure both of the marks and the amount of adherents present on conveyor belt 7 for determining the mark removal condition. However, a different sensor may be used for the individual measurements.

In the above-described embodiment, single CPU 31 may perform all of the processes. Nevertheless, the disclosure may not be limited to the specific embodiment thereof, and a plurality of CPUs, a special application specific integrated circuit ("ASIC"), or a combination of a CPU and an ASIC may be used to perform the processes.

While the disclosure has included various example structures and illustrative embodiments, it will be understood by those skilled in the art that other variations and modifications of the structures and embodiments described above may be made without departing from the scope of the disclosure.

Other structures and embodiments will be apparent to those skilled in the art from a consideration of the specification or practice of the embodiments disclosed herein. It is intended that the specification and the described examples are illustrative.

What is claimed is:

1. An image forming apparatus comprising:
a forming unit configured to form a mark for image adjustment;
a conveyor member configured to convey the mark formed by the forming unit;
a sensor configured to detect the mark conveyed by the conveyor member;
a conveyor member cleaner configured to remove the mark from the conveyor member; and
a controller configured to:
adjust an image formation process based on an output of the detection performed by the sensor;
control the forming unit to form the mark on a portion of the conveyor member;
determine a blank area of the conveyor member, the blank area comprising the portion when the mark is removed from the portion;
determine whether a length of the blank area is greater than a length of a sheet to be used for printing; and
control the forming unit to start printing of the print data when the blank area is facing the forming unit, in response to the controller determining that the length of the blank area is greater than the length of the sheet regardless whether the conveyor member cleaner completes removal of the mark.

2. The image forming apparatus according to claim 1, wherein the controller is further configured to control the forming unit to start printing when the blank area is facing the forming unit and after the conveyor member cleaner removes at least a part of the mark, in response to the controller determining that the length of the sheet is greater than the length of the blank area.

3. The image forming apparatus according to claim 2, wherein the controller is configured to control the forming unit to perform printing such that a trailing edge of the sheet remains within a mark-removed area, from which at least the part of the mark has been removed by the conveyor member cleaner, in response to the controller determining that the length of the sheet is greater than the length of the blank area.

4. The image forming apparatus according to claim 3, wherein the sensor is configured to measure an amount of reflected light from the conveyor member, and
wherein the controller is configured to:
determine whether the conveyor member cleaner has removed at least the part of the mark formed on the conveyor member, based on a measurement result of the sensor.

5. The image forming apparatus according to claim 1, wherein the controller is configured to:
detect a cancellation event after at least part of the mark is formed on the conveyor member;
cancel the forming of the mark in response to detecting the cancellation event; and
determine the blank area based on a timing at which the forming of the mark is cancelled.

6. The image forming apparatus according to claim 5, further comprising:
a sheet feeder configured to feed the sheet; and
a sheet conveyor configured to convey the sheet fed by the sheet feeder to a position where an image is formed,
wherein the controller is configured to control the sheet conveyor to hold the sheet while the forming unit forms the mark on the conveying member.

7. The image forming apparatus according to claim 5, further comprising:
an input device configured to accept a user's input of a cancellation instruction for cancelling the forming of the mark,
wherein the controller is configured to detect the cancellation event by detecting the cancellation instruction.

8. The image forming apparatus according to claim 5, wherein detecting the cancellation event comprises:
detecting a failure of a measurement of the mark.

9. The image forming apparatus according to claim 5, wherein detecting the cancellation event comprises:
determining that an additional measurement of the mark is unnecessary.

10. The image forming apparatus according to claim 1, wherein the controller includes a processor and memory storing computer readable instructions that, when executed by the processor, cause the controller to perform:
the adjusting of the image formation process;
the controlling of the forming unit to form the mark;
the determining of the blank area of the conveyor member;
the determining of whether the length of the blank area is greater than the length of the sheet to be used for printing; and
the controlling of the forming unit to start printing.

11. The image forming apparatus according to claim 1, wherein the controller comprises an application specific integrated circuit (ASIC) which is configured to perform:
the adjusting of the image formation process;
the controlling of the forming unit to form the mark;
the determining of the blank area of the conveyor member;
the determining of whether the length of the blank area is greater than the length of the sheet to be used for printing; and
the controlling of the forming unit to start printing.

12. The image forming apparatus according to claim 1, wherein the controller is configured to control a sheet conveyor to align a leading edge of the sheet and a leading edge of the blank area prior to controlling the forming unit to start printing.

13. The image forming apparatus according to claim 1, wherein determining the blank area of the conveyor member comprises calculating the blank area using data from the sensor.

14. The image forming apparatus according to claim 1, wherein determining the blank area of the conveyor member comprises:
determining a first length (L1) of the entire conveyor member;
determining a second length (L2) of a marked area of the conveyor member on which the mark is formed;
determining a third length (L3) of a mark-removed area of the conveyor member from which at least a part of the mark is removed; and
wherein the length (L4) of the blank area is determined according to the following expression: L4=L1−L2+L3.

15. The image forming apparatus according to claim 1, wherein the controller is configured to divide a mark area, in which the mark is present, into a plurality of regions and determine, for each of the plurality of regions, whether the mark is removed from that region.

16. The image forming apparatus according to claim 1, wherein the controller is configured to:

determine the length of the blank area by determining a position of a leading edge of a marked area and determining a length, from the position of the leading edge of the marked area, of a mark-removed area from which at least a part of the mark has been removed by the conveyor member cleaner; and control the forming unit to start printing when the length of the blank area becomes greater than the length of the sheet.

17. An image forming apparatus comprising:

a forming unit configured to form a mark for image adjustment;

a conveyor member configured to convey the mark formed by the forming unit;

a sensor configured to detect the mark conveyed by the conveyor member;

a conveyor member cleaner configured to remove the mark from the conveyor member; and a controller configured to:
  start formation of one or more marks;
  detect whether a cancellation event has occurred during the formation of the one or more marks;
  cancel the formation of the one or more marks in response to detecting that the cancellation event has occurred; and
  upon receiving print data, execute a printing process in response to cancelling the formation of the one or more marks, the printing process comprising:
    determining a blank area of the conveyor member;
    determining whether a sheet to be used for printing fits within the blank area; and
    controlling the forming unit to print the print data to the sheet on the blank area of the conveyor member in response to determining that the sheet fits within the blank area.

18. The image forming apparatus according to claim 17, wherein the determining of the blank area comprises calculating an area of the conveyor member from which at least one of the one or more marks have been removed, and wherein the controlling of the forming unit to print the print data comprises controlling the forming unit to start printing the print data before removing all of the one or more marks.

19. The image forming apparatus according to claim 18, wherein the controller is configured to postpone printing of the print data until after the conveyor member cleaner removes at least a part of the one or more marks.

20. An image forming apparatus comprising:

a forming unit for forming a mark for image adjustment;

a conveyor for conveying the mark formed by the forming unit;

a measuring unit for detecting the mark conveyed by the conveyor;

a removing unit for removing the mark from the conveyor; and a control means for:
  adjusting an image formation process based on an output of the detection performed by the measuring unit;
  controlling the forming unit to form the mark on a first portion of the conveyor;
  determining a blank area of the conveyor, the blank area comprising the first portion when the mark is removed from the first portion;
  determining whether a length of the blank area is greater than a length of a sheet to be used for printing; and
  controlling the forming unit to start printing when the blank area is facing the forming unit, in response to the control means determining that the length of the blank area is greater than the length of the sheet regardless whether the removing unit completes removal of the mark.

21. The image forming apparatus of claim 20, wherein the control means further controls the forming unit to form the mark on a second portion of the conveyor, wherein the blank area does not include the second portion when the mark is not removed from the second portion.

* * * * *